US012723907B2

(12) United States Patent
Kageyama

(10) Patent No.: US 12,723,907 B2
(45) Date of Patent: Sep. 1, 2026

(54) COMBINATION WEIGHING APPARATUS WITH UNIFORM ARTICLE DISTRIBUTION

(71) Applicant: Ishida Co., Ltd., Kyoto (JP)

(72) Inventor: Toshiharu Kageyama, Ritto (JP)

(73) Assignee: Ishida Co., Ltd., Kyoto (JP)

(*) Notice: Subject to any disclaimer, the term of this patent is extended or adjusted under 35 U.S.C. 154(b) by 295 days.

(21) Appl. No.: 18/438,375

(22) Filed: Feb. 9, 2024

(65) Prior Publication Data

US 2024/0280399 A1 Aug. 22, 2024

(30) Foreign Application Priority Data

Feb. 16, 2023 (JP) ................................ 2023-022692

(51) Int. Cl.
*G01G 13/02* (2006.01)

(52) U.S. Cl.
CPC .................................. *G01G 13/026* (2013.01)

(58) Field of Classification Search
CPC ........................... G01G 13/026; G01G 19/393
See application file for complete search history.

(56) References Cited

U.S. PATENT DOCUMENTS 8,569,634 B2 10/2013 Kageyama et al.
2010/0108404 A1* 5/2010 Kieselhorst .......... G01G 19/393 177/25.18
2024/0270507 A1* 8/2024 Kageyama ........... G01G 19/393

FOREIGN PATENT DOCUMENTS

CN 202522305 U * 11/2012 ........... G01G 19/393
CN 110155746 A * 8/2019 ............. G01G 13/24
(Continued)

OTHER PUBLICATIONS

Machine translation of JP-2014105994 (Year: 2014).*
(Continued)

*Primary Examiner* — Natalie Huls
(74) *Attorney, Agent, or Firm* — Studebaker Brackett PLLC

(57) ABSTRACT

A combination weighing apparatus (1) includes: an article supplier (13) that has an outlet allowing articles supplied from outside to be discharged and conveys the articles in response to vibrations from a first vibrator (11); a distribution table (14) circular in plan view that discharges, in response to vibrations from a second vibrator (12), the articles supplied from the article supplier (13) in a radial direction while spiraling the articles in a circumferential direction; a wall (15) arc-shaped that is attached to a first circumferential edge (141) located downstream of the article supplier (13) and prevents discharge of the articles from the first circumferential edge (141), the first circumferential edge (141) being part of a circumferential edge of the distribution table; a plurality of feeding troughs (16) arrayed fanwise along a second circumferential edge (142) that is part of the circumferential edge of the distribution table (14) and is out of the first circumferential edge (141); and a controller (17) that controls the vibrations of the first vibrator (11) and the vibrations of the second vibrator (12) such that a discharge direction (D1) in which the articles are discharged from the article supplier (13) to the first circumferential edge (141) and a conveyance direction (D2) of the articles on the distribution table (14) corresponding to the first circumferential edge (141) are mutually inverse and an aggregate of the articles is formed at the first circumferential edge (141).

4 Claims, 3 Drawing Sheets

(56) References Cited

FOREIGN PATENT DOCUMENTS

| | | | | | |
|---|---|---|---|---|---|
| JP | 5095477 | B2 | | 12/2012 | |
| JP | 5314506 | B2 | | 10/2013 | |
| JP | 2014105994 | A | * | 6/2014 | |
| JP | 5993722 | B2 | | 9/2016 | |
| WO | WO-2009128379 | A1 | * | 10/2009 | ........... G01G 13/026 |
| WO | 2016/143709 | A1 | | 9/2016 | |

OTHER PUBLICATIONS

The extended European search report issued by the European Patent Office on Jun. 13, 2024, which corresponds to European Patent Application No. 24157098.5.

* cited by examiner 16
15B(15)
141B(141)
14B(14)
142B(142)
X
13B
L2
13
13A
C1
142A(142)
D1
D1
D1
D2
D2
C2
L1
O1
Dr
16
14A(14)
X
141A(141)
16E

COMBINATION WEIGHING APPARATUS WITH UNIFORM ARTICLE DISTRIBUTION

CROSS-REFERENCE TO RELATED APPLICATIONS

This application is based upon and claims the benefit of priority from Japanese Patent Application No. 2023-022692 filed on Feb. 16, 2023 in Japan, the entire contents of which are incorporated herein by reference.

TECHNICAL FIELD

The present invention relates to a combination weighing apparatus.

BACKGROUND ART

Conventionally, known has been an article supply method with a combination of a supply apparatus (cross feeder), a sorter, one or two supply feeders, and a distribution table. The supply apparatus supplies a combination weighing apparatus with articles supplied from the upstream side. The sorter is located downstream of the supply apparatus and sorts articles to each channel (combination weighing mechanism). Downstream of the sorter, the one or two supply feeders are provided at a machinery center, and the distribution table has a partial region prescribed as a non-discharge region.

SUMMARY OF THE INVENTION

However, according to the article supply method described above, as a disadvantage, the amount of supply of articles varies between feeding troughs provided along the circumferential edge of the distribution table.

Thus, the present invention has been made in consideration of the above problem, and an object of the present invention is to provide a combination weighing apparatus enabling uniform supply of articles between feeding troughs.

A combination weighing and counting apparatus according to an embodiment is summarized as including a first vibrator that generates vibrations; a second vibrator that generates vibrations; an article supplier that has an outlet allowing articles supplied from outside to be discharged and conveys the articles in response to the vibrations from the first vibrator; a distribution table circular in plan view that discharges, in response to the vibrations from the second vibrator, the articles supplied from the article supplier in a radial direction while spiraling the articles in a circumferential direction; a wall arc-shaped that is attached to a first circumferential edge located downstream of the article supplier and prevents discharge of the articles from the first circumferential edge, the first circumferential edge being part of a circumferential edge of the distribution table; a plurality of feeding troughs arrayed fanwise along a second circumferential edge that is part of the circumferential edge of the distribution table and is out of the first circumferential edge; and a controller that controls the vibrations of the first vibrator and the vibrations of the second vibrator such that a discharge direction in which the articles are discharged from the article supplier to the first circumferential edge and a conveyance direction of the articles on the distribution table corresponding to the first circumferential edge are mutually inverse and an aggregate of the articles is formed at the first circumferential edge.

According to the present invention, it is possible to provide a combination weighing apparatus enabling uniform supply of articles between feeding troughs.

DESCRIPTION OF EMBODIMENTS

Figure 1:
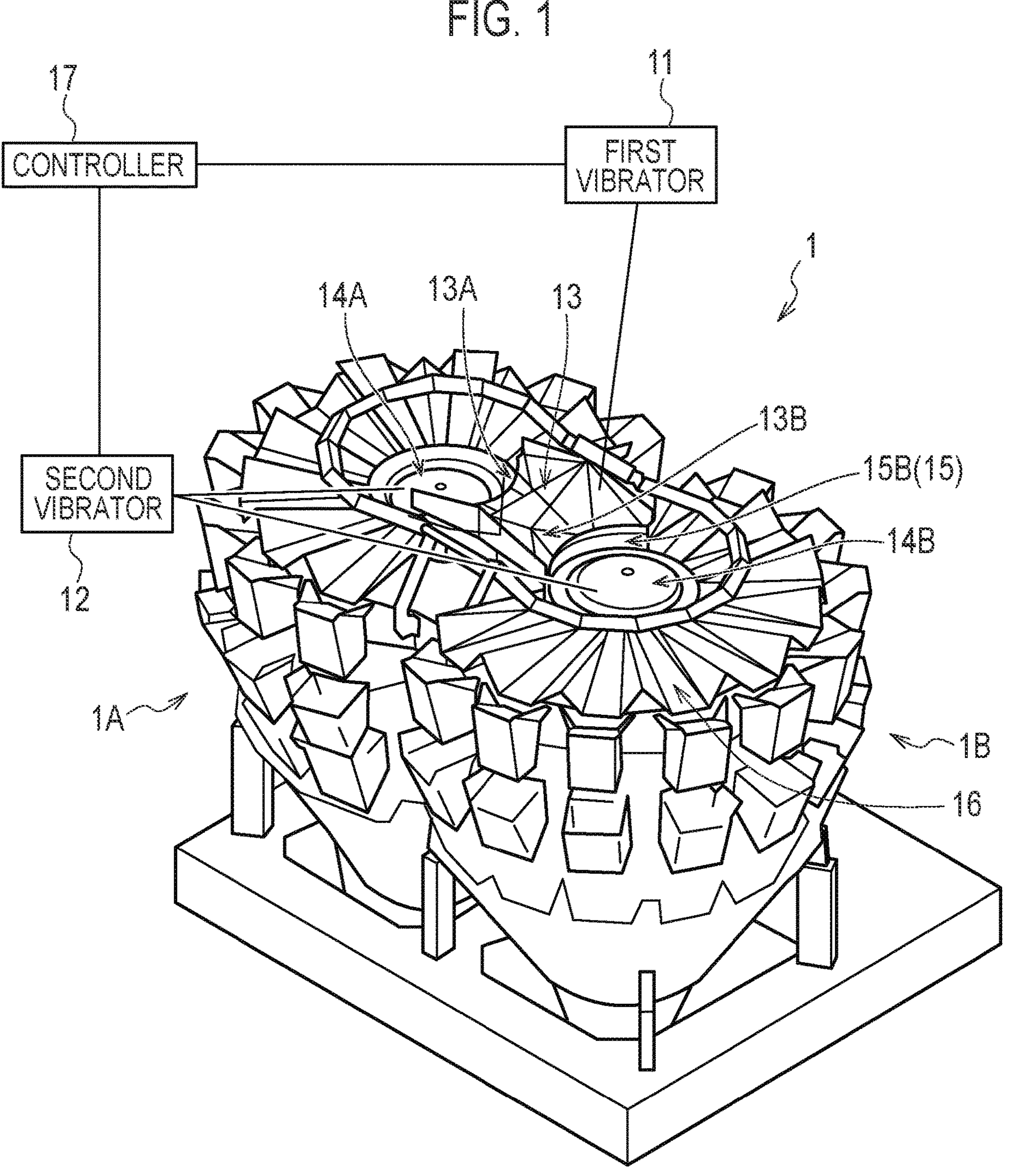
FIG. 1 is an explanatory view for an exemplary entire configuration of a combination weighing apparatus according to an embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

A combination weighing apparatus 1 of a first embodiment of the present invention will be described below with reference to FIGS. 1 to 3.

Figure 2:
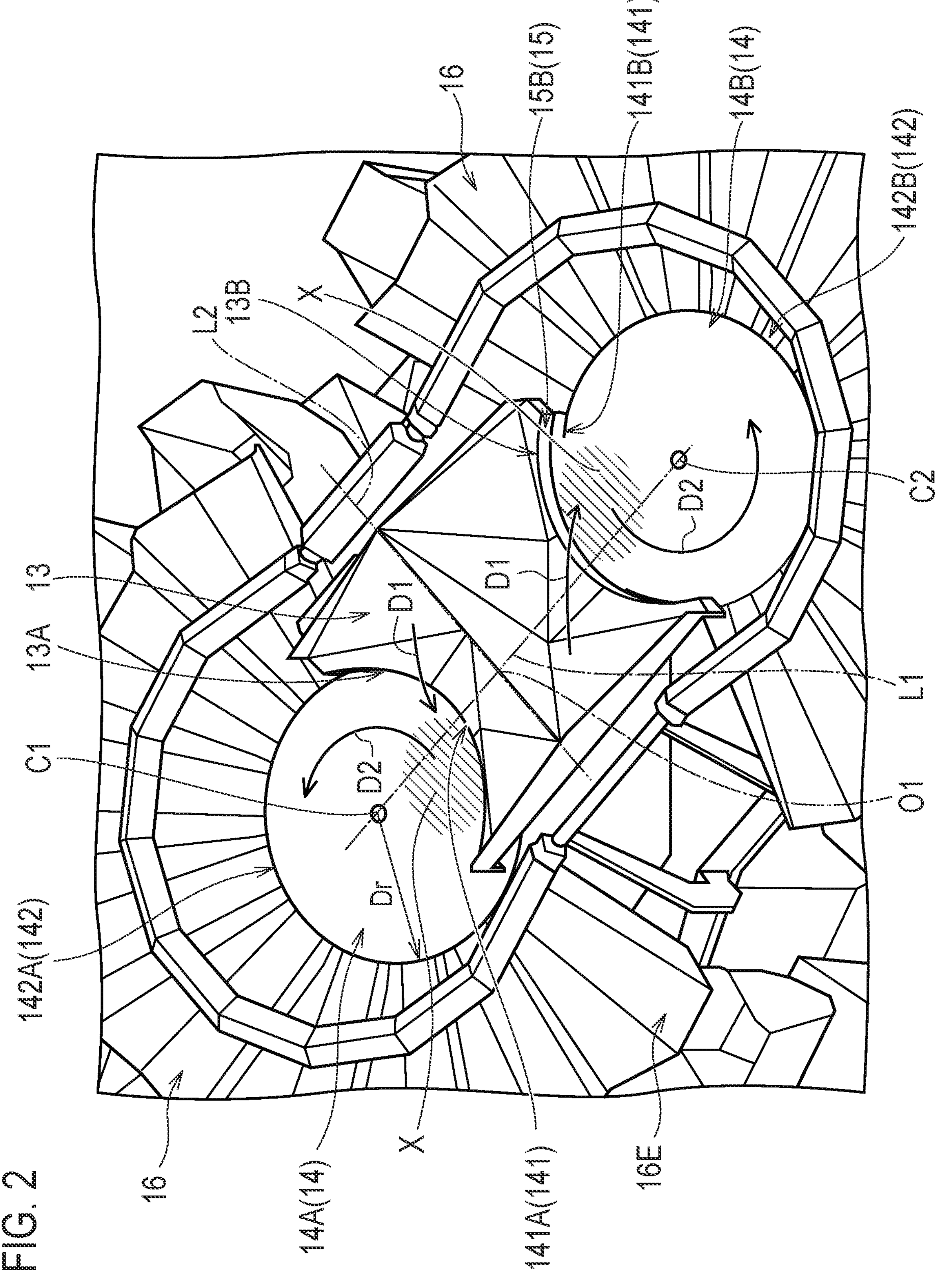
FIG. 2 is a top view of FIG. 1.

As illustrated in FIGS. 1 and 2, the combination weighing apparatus 1 according to the present embodiment includes a first combination weighing mechanism 1A and a second combination weighing mechanism 1B adjacent to each other. In the present embodiment, an exemplary combination weighing apparatus 1 including two adjacent combination weighing mechanisms will be described. However, the present invention is not limited to such an example and thus can be applied to a combination weighing apparatus 1 including a single combination weighing mechanism or three or more combination weighing mechanisms.

As illustrated in FIGS. 1 and 2, the combination weighing apparatus 1 according to the present embodiment includes a first vibrator 11, a second vibrator 12, an article supplier 13, a distribution table 14, a wall 15, a plurality of feeding troughs 16, and a controller 17.

The first vibrator 11 generates vibrations to the article supplier 13. The second vibrator 12 generates vibrations to the distribution table 14.

The article supplier 13 has outlets 13A and 13B allowing articles supplied from outside to be discharged to the distribution table 14 (14A, 14B). Note that, in response to vibrations from the first vibrator 11, the article supplier 13 conveys the articles.

In response to vibrations from the second vibrator 12, as illustrated in FIG. 2, the distribution table 14 discharges the articles supplied from the article supplier 13 in a radial direction Dr while spiraling the articles in a circumferential direction D2. The distribution table 14 is circular in shape in plan view.

Note that, in the combination weighing apparatus 1 according to the present embodiment, as illustrated in FIGS. 1 and 2, the distribution table 14 includes a first distribution table 14A and a second distribution table 14B that the first combination weighing mechanism 1A and the second combination weighing mechanism 1B includes, respectively. The first distribution table 14A and the second distribution table 14B are independent from each other.

As illustrated in FIG. 2, the rotational direction (circumferential direction) D2 of the first distribution table 14A and the rotational direction (circumferential direction) D2 of the second distribution table 14B are identical to each other.

Figure 3:
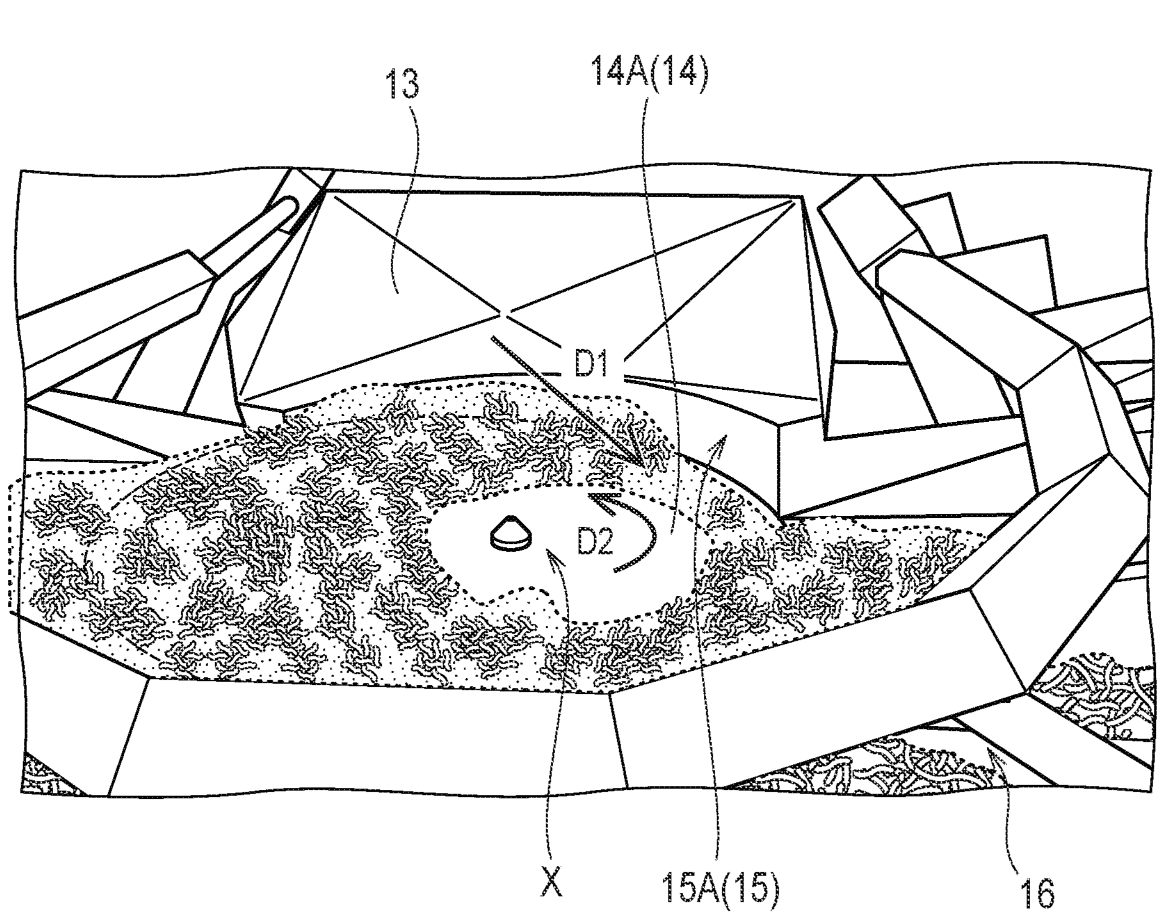
FIG. 3 is an explanatory view for an exemplary effect of the combination weighing apparatus according to the embodiment.

As illustrated in FIGS. 1 to 3, the wall 15 is attached to a first circumferential edge 141 that is located downstream of the article supplier 13 and is part of the circumferential edge of the distribution table 14. The wall 15 prevents discharge of articles from the first circumferential edge 141. The wall 15 is shaped like an arc.

Note that, in the combination weighing apparatus 1 according to the present embodiment, as illustrated in FIGS. 1 to 3, the first combination weighing mechanism 1A is provided with a wall 15A, and the second combination weighing mechanism 1B is provided with a wall 15B.

Specifically, the wall 15A is attached to a first circumferential edge 141A that is located downstream of the article supplier 13 and is part of the circumferential edge of the distribution table 14A. The wall 15A prevents discharge of articles from the first circumferential edge 141A.

Meanwhile, the wall 15B is attached to a first circumferential edge 141B that is located downstream of the article supplier 13 and is part of the circumferential edge of the distribution table 14B. The wall 15B prevents discharge of articles from the first circumferential edge 141B.

As illustrated in FIGS. 1 and 2, the plurality of feeding troughs 16 is arrayed fanwise along a second circumferential edge 142 (142A, 142B) that is part of the circumferential edge of the distribution table 14 (14A, 14B) and is out of the first circumferential edge 141 (141A, 141B).

The controller 17 controls the vibrations of the first vibrator 11 and the vibrations of the second vibrator 12 such that a discharge direction D1 in which articles are discharged from the article supplier 13 to the first circumferential edge 141 (141A, 141B) and the conveyance direction (circumferential direction) D2 of articles on the distribution table 14 (14A, 14B) corresponding to the first circumferential edge 141 (141A, 141B) are mutually inverse and an aggregate of articles is formed near the first circumferential edge 141 (141A, 141B).

The effect of the combination weighing apparatus 1 according to the present embodiment will be described below with reference to FIGS. 2 and 3.

In the combination weighing apparatus 1 according to the present embodiment, when the article supplier 13 supplies articles to the distribution tables 14A and 14B through the outlets 13A and 13B, respectively, due to respective rotations of the distribution tables 14A and 14B, the articles are discharged to the feeding troughs 16 in the order from upstream to downstream in the rotational direction D2 of the distribution tables 14A and 14B.

In this case, as illustrated in FIGS. 2 and 3, a region X, in which no article is present, appears on each of the distribution tables 14A and 14B. The region X appears near the most downstream portion in the rotational direction D2 of each of the distribution tables 14A and 14B.

As a result, disadvantageously, most of the articles supplied from the article supplier 13 are not discharged to a feeding trough 16 disposed near the most downstream portion in the rotational direction D2 of each of the distribution tables 14A and 14B (e.g., a feeding trough 16E illustrated in FIG. 2).

Therefore, in the combination weighing apparatus 1 according to the present embodiment, the discharge direction D1 in which articles are discharged from the article supplier 13 to each of the first circumferential edges 141A and 141B and the conveyance direction (circumferential direction) D2 of articles on the distribution tables 14A and 14B corresponding, respectively, to the first circumferential edges 141A and 141B are mutually inverse, and the article supplier 13 discharges articles to the region X.

As a result, the combination weighing apparatus 1 according to the present embodiment enables discharge of articles to a feeding trough 16 disposed near the most downstream portion in the rotational direction D2 of each of the distribution tables 14A and 14B. Thus, uniform supply of articles can be achieved between the feeding troughs.

As illustrated in FIG. 2, the article supplier 13 is asymmetric about a second straight line L2 that passes through the center O1 of a first straight line L1 connecting the center C1 of the first distribution table 14A and the center C2 of the second distribution table 14B and is orthogonal to the first straight line L1.

According to such a configuration, a clockwise or counterclockwise conveyance force due to the first vibrator 11 and the faces different in the angle of inclination that the article supplier 13 has enable a guide to the region X desired on each of the distribution tables 14A and 14B.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. A combination weighing apparatus comprising:

a first vibrator that generates vibrations;

a second vibrator that generates vibrations;

an article supplier that has an outlet allowing articles supplied from outside to be discharged and conveys the articles in response to the vibrations from the first vibrator;

a distribution table circular in plan view that discharges, in response to the vibrations from the second vibrator, the articles supplied from the article supplier in a radial direction while spiraling the articles in a circumferential direction;

a wall arc-shaped that is attached to a first circumferential edge located downstream of the article supplier and prevents discharge of the articles from the first circumferential edge, the first circumferential edge being part of a circumferential edge of the distribution table;

a plurality of feeding troughs arrayed fanwise along a second circumferential edge that is part of the circumferential edge of the distribution table and is out of the first circumferential edge; and a controller configured to control the vibrations of the first vibrator and the vibrations of the second vibrator such that a discharge direction in which the articles are discharged from the article supplier to the first circumferential edge and a conveyance direction of the articles on the distribution table corresponding to the first circumferential edge are mutually inverse and an aggregate of the articles is formed at the first circumferential edge.

2. The combination weighing apparatus according to claim 1, further comprising a first combination weighing mechanism and a second combination weighing mechanism adjacent to each other, wherein the distribution table includes a first distribution table and a second distribution table that the first combination weighing mechanism and the second combination weighing mechanism include, respectively, the first distribution table and the second distribution table being independent from each other, and a rotational direction of the first distribution table and a rotational direction of the second distribution table are identical to each other.

3. The combination weighing apparatus according to claim 2, wherein the article supplier is asymmetric about a second straight line that passes through a center of a first straight line connecting a center of the first distribution table and a center of the second distribution table and is orthogonal to the first straight line.

4. The combination weighing apparatus according to claim 1, wherein the discharge direction of the articles from the article supplier onto the distribution table over the first circumferential edge opposes the conveyance direction of the articles on the distribution table at a position at which the articles from the article supplier land on the distribution table and the aggregate of the articles is formed at the first circumferential edge.

* * * * *